Sept. 5, 1967     J. WILLIAMS     3,339,565
VEHICLE WASHING APPARATUS
Filed Oct. 22, 1965                5 Sheets-Sheet 3
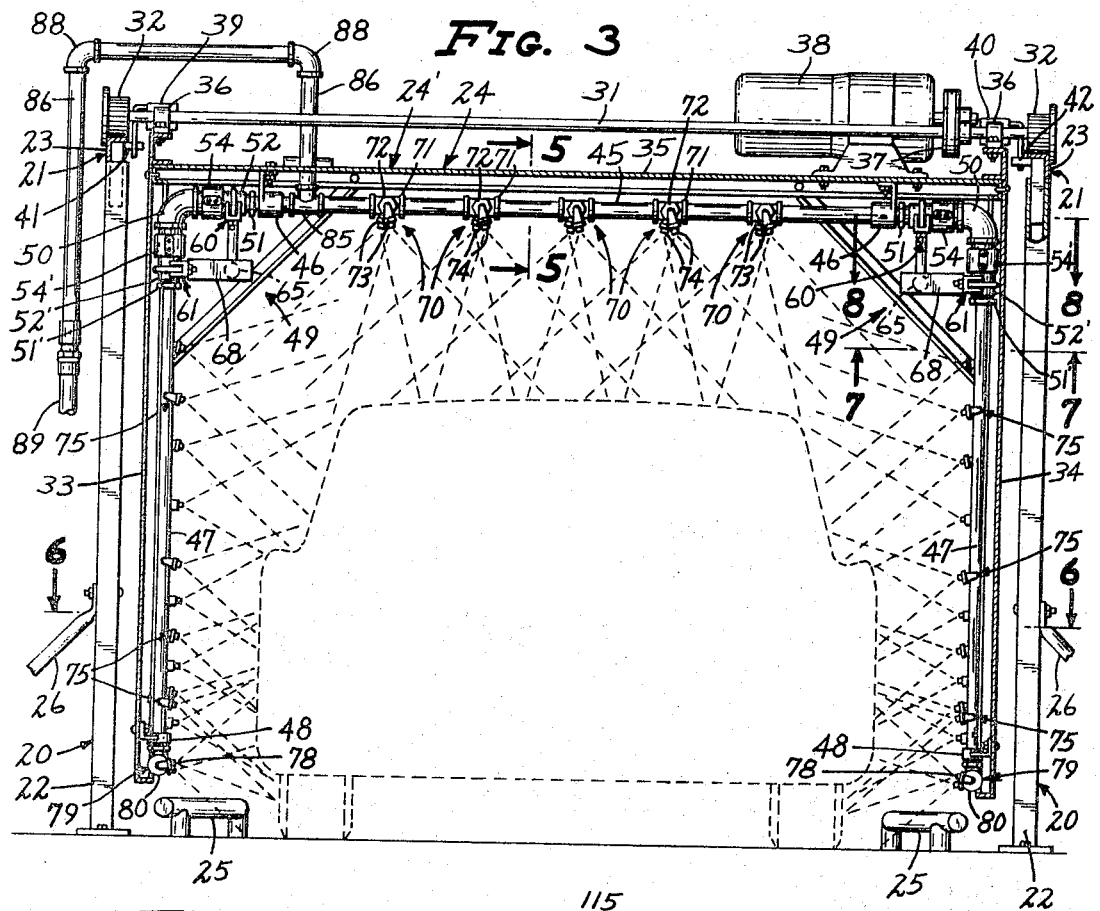
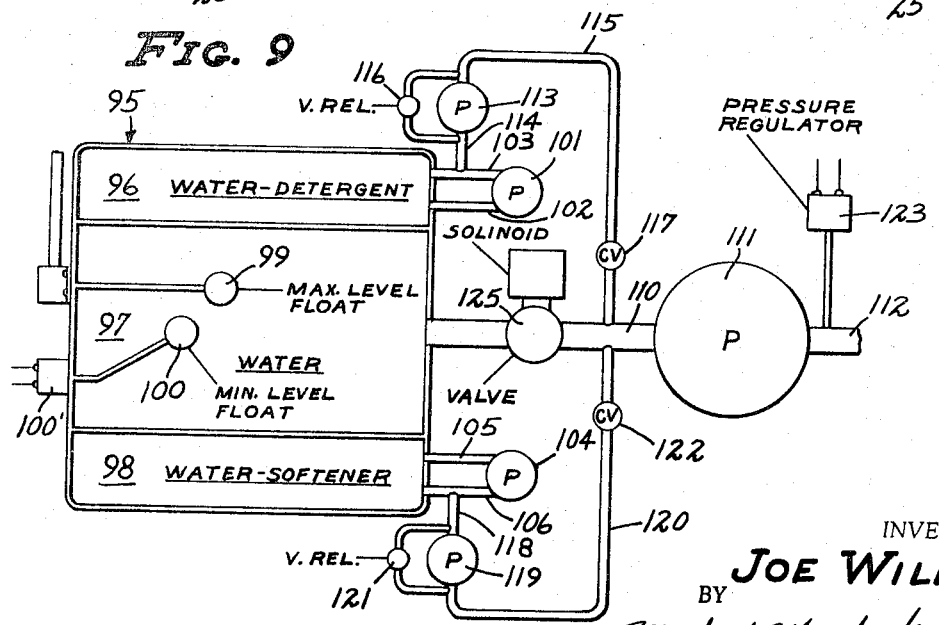
INVENTOR.
JOE WILLIAMS
BY
Merchant, Merchant & Gould
ATTORNEYS

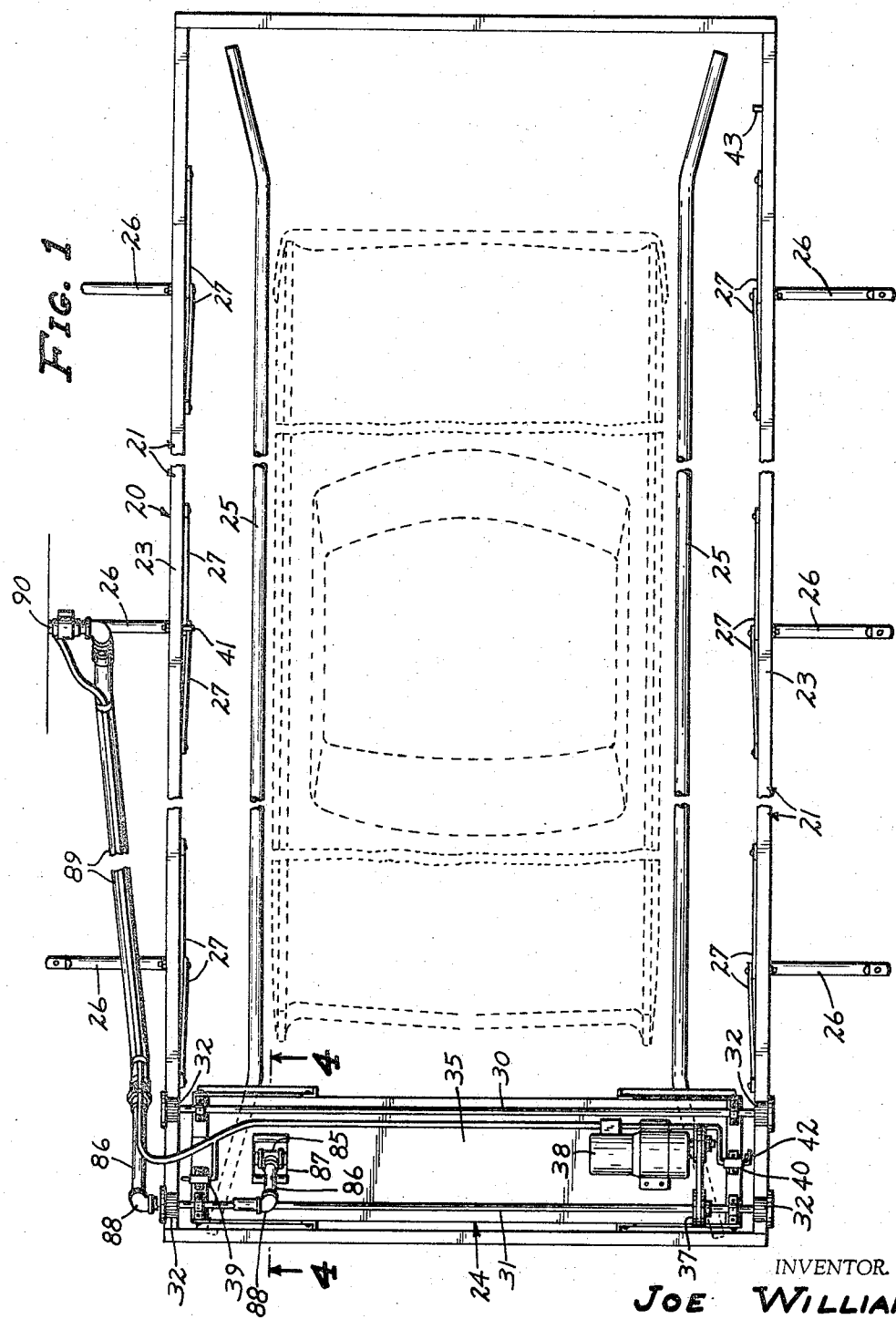

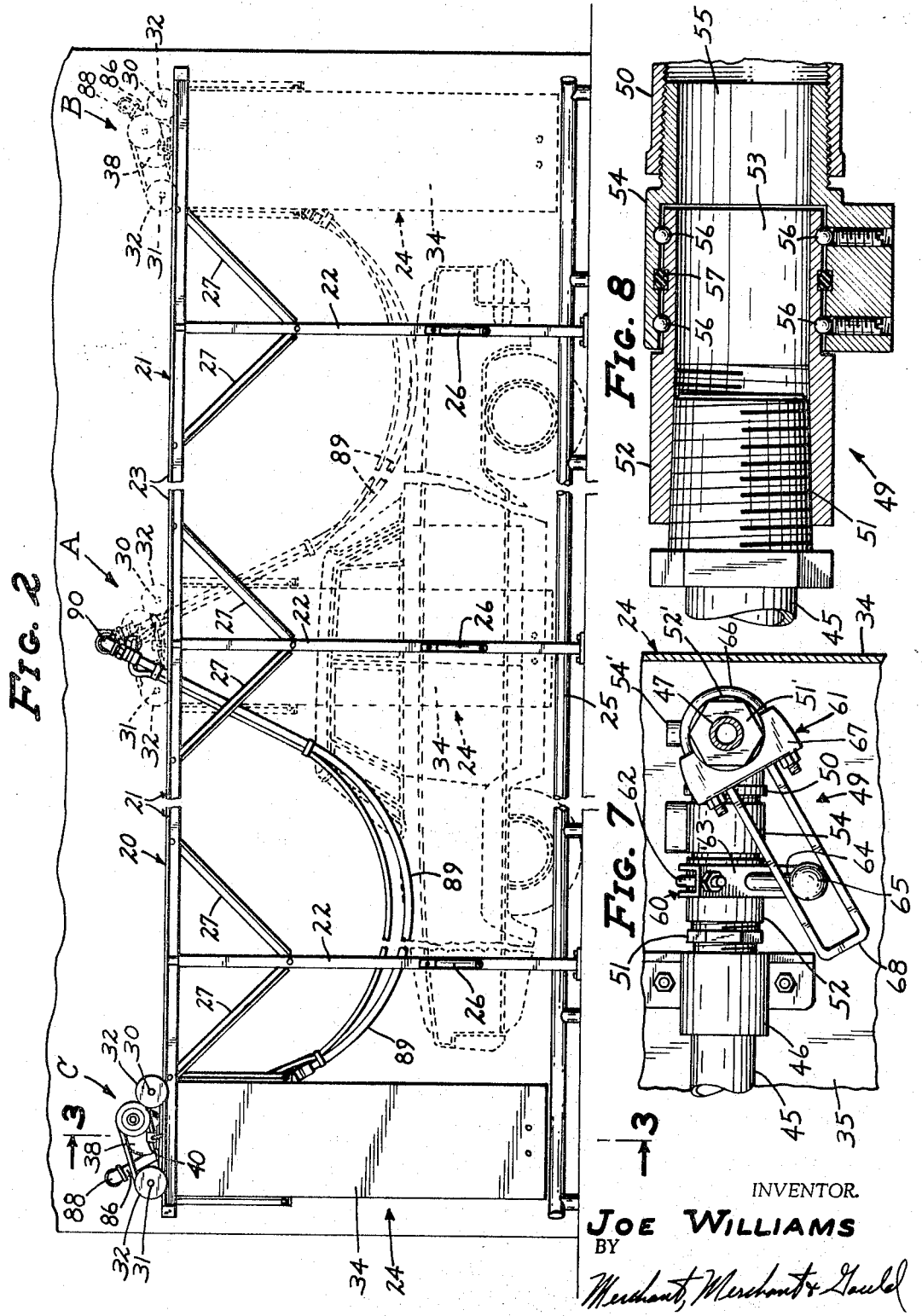

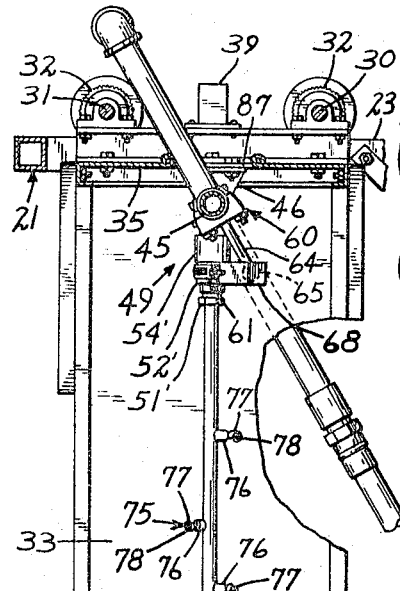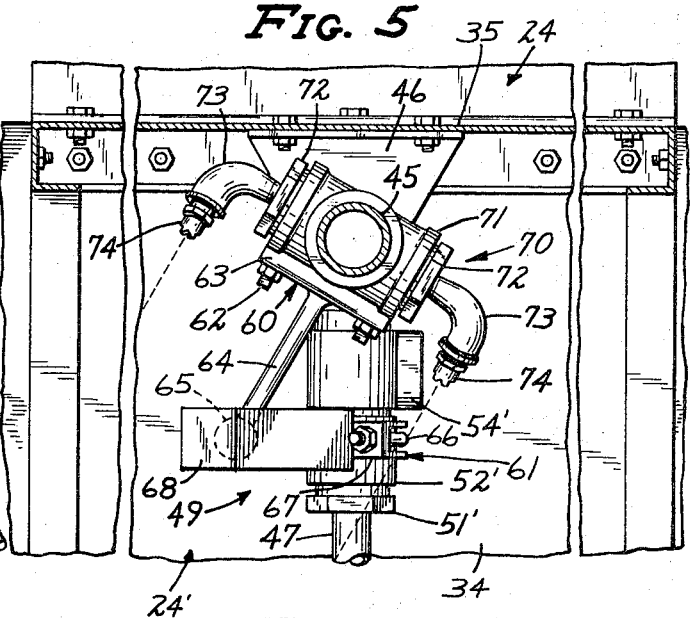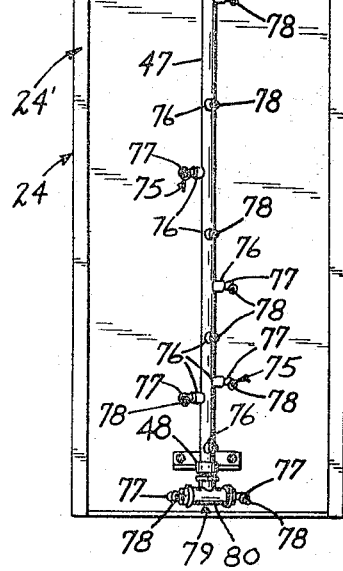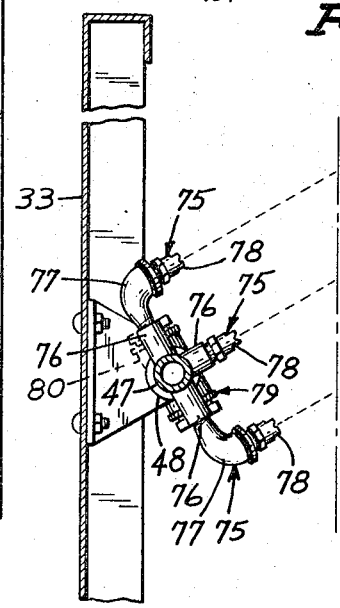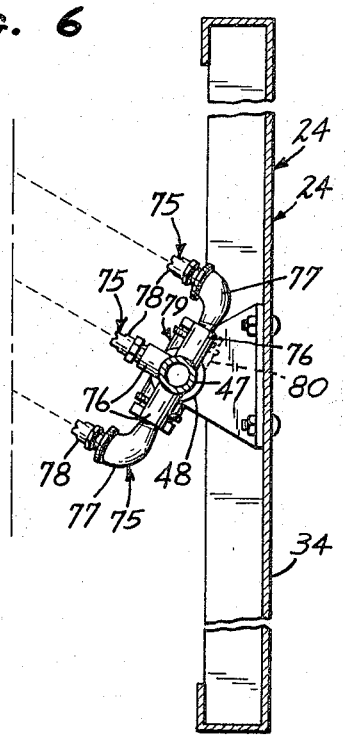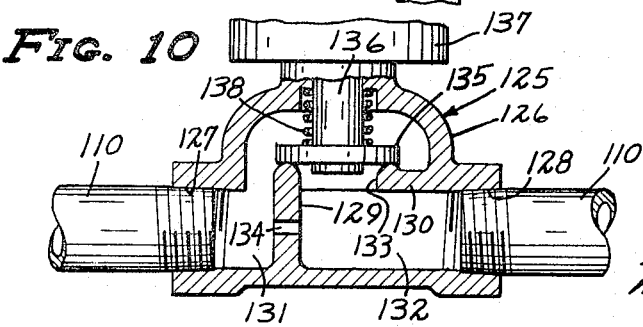
INVENTOR.
JOE WILLIAMS
ATTORNEYS

INVENTOR.
JOE WILLIAMS

United States Patent Office 3,339,565
Patented Sept. 5, 1967

3,339,565
VEHICLE WASHING APPARATUS
Joe Williams, Box 337, Gettysburg, S. Dak. 57442
Filed Oct. 22, 1965, Ser. No. 501,289
6 Claims. (Cl. 134—58)

This invention pertains to a new and improved vehicle washing apparatus and more particularly to car washing apparatus which moves relative to the vehicle and directs sprays of water at an angle to the surface of the vehicle while progressing through a sequence of car washing operations, which operations may be chosen in advance.

In vehicle washing apparatus of the commercial class there are in general two types, apparatus which moves the vehicle through a spray and apparatus which moves a spray over the vehicle. The latter type is of interest in this specification. In prior art vehicle washing apparatus of the moving spray type a frame work carrying a plurality of nozzles directed perpendicular to the surface of the vehicle moves from one end of the vehicle to the other in a regular, unvarying sequence. That is, in general these apparatus rinse the vehicle, soap the vehicle, and then rinse the vehicle again with a softener or the like to insure a non-spotty drying.

There are many disadvantages to these prior art apparatus, the uppermost being that each vehicle may have a different type or degree of dirt thereon but the vehicle washing apparatus has only a single washing cycle. Also, by directing the spray perpendicular to the surface of the vehicle, the full value of the spray is not realized.

In the present invention a moving frame has a plurality of nozzles mounted thereon so that their sprays cooperate to completely cover the surface of a vehicle along a relatively wide cross-section thereof. As the moving frame travels from the center of the vehicle toward either end the nozzles are tilted gradually until the moving frame reaches the end of its travel at which time the nozzles are directed toward the end of the vehicle. Thus, the water is directed at an angle to the surface of the vehicle so that the dirt thereon is most effectively cut from the surface of the vehicle by the spray. In addition, either end of the vehicle is completely included within the washing operation.

The present invention also has the control means through which the sequence of the various washing operations can be manually changed to provide any type of washing operation necessary. As an example of the various washing operations which are available in the present apparatus, a low pressure rinse cycle, a water-detergent cycle, a high pressure rinse cycle, and a water softener cycle are set forth in detail presently. These various cycles may be performed in any sequence desired or any of the various cycles may be omitted or repeated. Because of this greatly improved versatility the present apparatus can most efficiently wash any vehicle. It is simply up to the operator to determine, through experience, the sequence of cycles required to most efficiently clean the vehicle and then manually set the control means to this sequence. Thus, the present apparatus is extremely versatile and efficient.

It is an object of the present invention to provide a new and improved vehicle washing apparatus.

It is a further object of the present invention to provide a vehicle washing apparatus with a spray that strikes all portions of the vehicle and which strikes the surface of the vehicle generally at an acute angle to maximize the washing ability of the spraying action.

It is a further object of the present invention to provide a vehicle washing apparatus with a manually variable sequence of washing cycles.

It is a further object of the present invention to provide a vehicle washing apparatus with a greatly increased efficiency and an improved operation.

These and other objects of this invention will become apparent to those skilled in the art upon consideration of the accompanying specification, claims and drawings.

Referring to the drawings, wherein like characters indicate like parts throughout the figures:

FIG. 1 is a view in top plan of the present invention having an automobile shown by dotted lines situated therein;

FIG. 2 is a view in side elevation of the present invention illustrating the various positions of the apparatus;

FIG. 3 is a sectional view as seen from the line 3—3 in FIG. 2;

FIG. 4 is an enlarged sectional view as seen from the line 4—4 in FIG. 1, parts thereof broken away;

FIG. 5 is an enlarged sectional view as seen from the line 5—5 in FIG. 3;

FIG. 6 is an enlarged sectional view as seen from the line 6—6 in FIG. 3;

FIG. 7 is an enlarged sectional view as seen from the line 7—7 in FIG. 3;

FIG. 8 is an enlarged sectional view as seen from the line 8—8 in FIG. 3;

FIG. 9 is a block diagram of the fluid pump system;

FIG. 10 is an axial sectional view in detail of a solenoid valve; and

Figure 11:
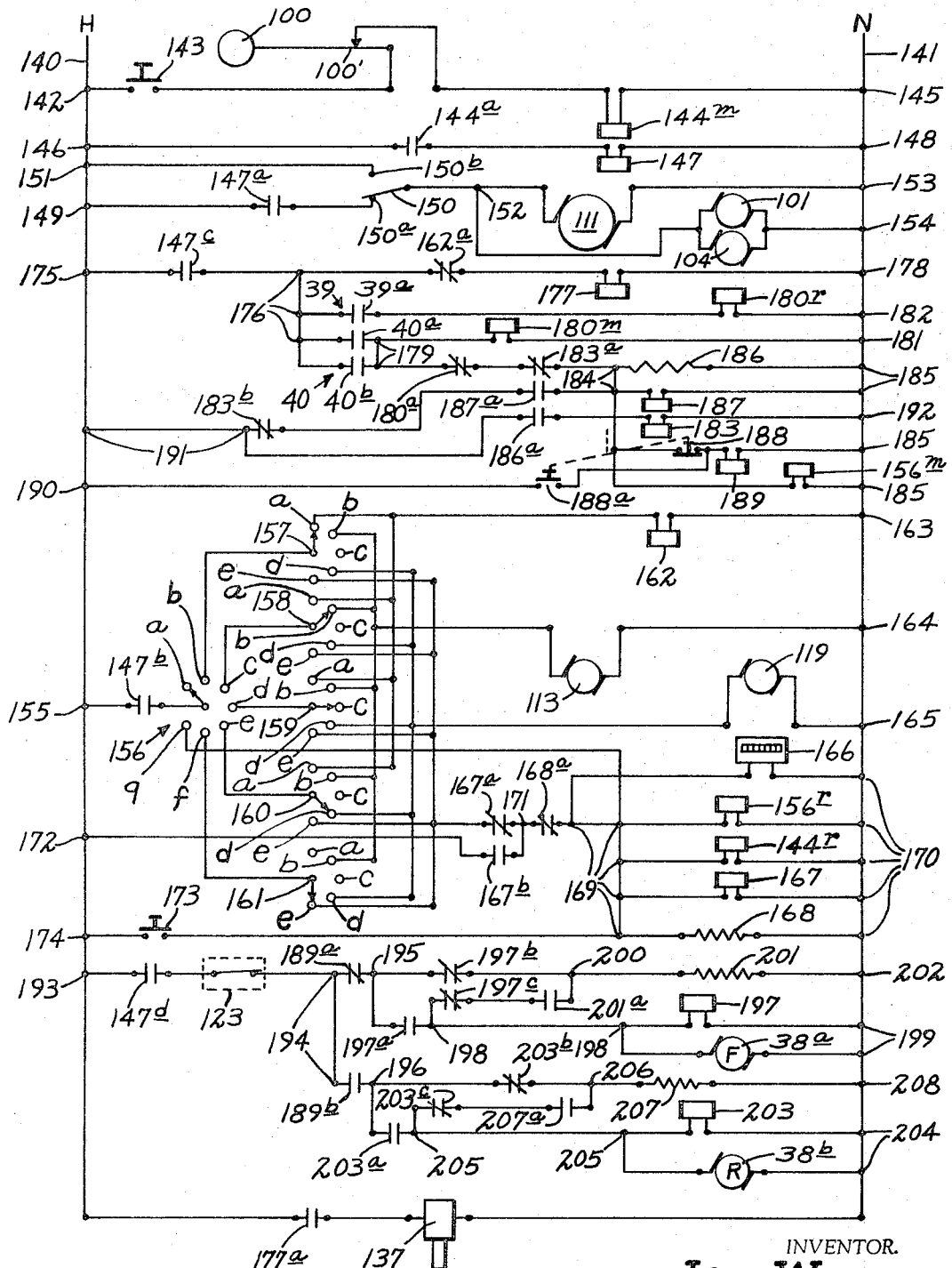
FIG. 11 is an electrical schematic diagram of the control means.

In the figures the numeral 20 generally designates a stationary frame having an upper rectangular shaped portion 21 and positioned substantially above the top of an automobile and supported on either side by three columns 22. The long sides 23 serve as tracks to support a movable frame, generally designated 24. A pair of spaced apart, parallel rods 25 are mounted slightly above the surface of the floor to serve as guides for the automobile to insure the correct positioning thereof. The stationary frame 20 is constructed of angle irons or any other rigid material which will withstand the weight of the moving frame 24 as it travels from one end of the stationary frame to the other. In addition, the stationary frame may have any additional braces, such as the struts 26 between the columns 22 and ground and the struts 27 between the columns 22 and the tracks 23, as may be required for the particular installation.

The movable frame 24 has a pair of spaced apart parallel rods 30 and 31 which extend across the top of the stationary frame 20 perpendicular to the long sides or tracks 23 and have a wheel 32 at either end thereof. Each of the four wheels 32 at the ends of the rods 30 and 31 are flanged along the outer edge thereof to engage the sides of tracks 23 and substantially prevent transverse movement thereof. A three-sided splash retarding enclosure 24' having a left substantially rectangular side 33, a matching spaced apart right side 34 and an upper side 35 is attached beneath the rods 30 and 31 by means of pedestal bearings 36 mounted at either corner of the upper side 35 and having the rods 30 and 31 passing therethrough. The wheels 32 are fixedly attached therebetween. The pulley 37 is driven by means of a reversible motor 38, which is fixedly mounted on the upper surface of the upper side 35. Thus, the motor 38 drives the movable frame 24 along the tracks 23 of the stationary frame 20 and longitudinally from one end of the automobile to the other. The control of the motor 38 will be discussed in more detail relative to FIG. 10.

Also mounted on the upper surface of the upper side 35 of enclosure 24' are a pair of limit switches 39 and 40. Limit switch 39 is mounted on the upper surface at the left end of the upper side 35, referring to FIG. 1, and limit switch 40 is mounted on the upper surface at the right end thereof. An actuating pin 41 is mounted on the inner edge of the left track 23 approximately midway between the ends thereof and a pair of actuating pins 42 and 43 are mounted on the inner edge adjacent either end of the other track 23. The switches 39 and 40 and the actuating pins 41, 42 and 43 are of the type that cause the switches to close as the movable frame 24 passes thereby. The operation of the limit switches 39 and 40 will be discussed in more detail with respect to the FIG. 10.

A conduit 45 is rotatably attached to the undersurface of the upper side 35 of enclosure 24' by means of a pedestal bearing 46 adjacent either end thereof. The conduit 45 is mounted approximately centrally under the upper side 35 and perpendicular to the direction of movement of the movable frame 24. A pair of conduits 47 are positioned approximately centrally adjacent the inner surfaces of the left and right sides 33 and 34 of the enclosure 24'. A pedestal bearing 48 adjacent the lower end of each of the conduits 47 maintains the lower ends of the conduits in position while allowing rotation about the longitudinal axis thereof. The upper end of each of the conduits 47 is attached to either end of the conduit 45 by pivotal means, generally designated 49, and an elbow 50. The pivotal means 49 and elbow 50 provide a path for fluid between the conduit means 45 and 47 while allowing rotation of each conduit means 45 and 47 about its respective longitudinal axis. The pivotal means 49 can be seen more clearly in FIGS. 7 and 8.

Referring to FIG. 8 the end of the conduit 45 is threadedly engaged in a reducer bushing 51. The reducer bushing 51 is in turn threadedly engaged in one end of a nipple 52 the other end of which has a portion 53 with a slightly reduced outer diameter. A second nipple 54 has a portion 55 with a reduced inner diameter which mates coaxially with the portion 53 of the nipple 52. Two sets of ball bearings 56 are positioned between the portion 55 of the nipple 54 and the portion 53 of the nipple 52 to provide relative rotary motion therebetween. An O-ring 57, which may be made of rubber or some other resilient material, is positioned between the portions 53 and 55 of the nipples 52 and 54 to prevent the flow of fluid therebetween. One end of the elbow 50 is threadedly engaged on the open end of the nipple 54 and the other end of the elbow 50 has a similar set of nipples 52' and 54' attached thereto in a similar fashion and connected to the vertical conduit 47. Thus, the conduit 45 and the conduits 47 are free to rotate about their respective longitudinal axis while allowing a flow of fluid therebetween.

The nipple 52 connected to the conduit 45 through the reducer bushing 51 and the other nipple 52' in the same pivotal means 49, which is connected to the conduit 47 through another reducer bushing 51', each have a clamping yoke, generally designated 60 and 61 respectively, attached thereto. The clamping yoke 60 connected to the nipple 52 consists of a U-shaped bolt 62 which fits over the nipple 52 and a cooperating clamping member 63 which engages both ends of the U bolt 62 and holds it fixedly in place. A rod 64 having an enlarged spherical end 65 thereon extends outwardly from the clamping member 63 perpendicular to the longitudinal axis of the conduit 45. The clamping yoke 60 holds the rod 64 rigidly in place so that any rotational movement of the rod 64 about the longitudinal axis of the conduit 45 causes rotation of the conduit 45 also.

The second clamping yoke 61 attached to the nipple 52' consists of a U bolt 66 and a cooperating clamping member 67 which are similar to the clamping yoke 60. An elongated U-shaped member 68 has the ends of both arms fixedly attached to the clamping member 67 so that it forms an enclosed slot extending from the clamping member 67 perpendicular to the longitudinal axis of the conduit 47. The clamping yokes 60 and 61 are situated so that the enlarged spherical end 65 of the rod 64 is positioned within the slot in the U-shaped member 68.

Also, the diameter of the spherical end 65 is such as to allow relative movement along the length of the slot while substantially preventing transverse movement. Thus, when the conduit 45 is rotated about its longitudinal axis the spherical end 65 on the rod 64 engages the member 68 causing the conduit 47 to be rotated about its longitudinal axis a substantially equal amount.

The conduit 45 has a plurality of nozzle assemblies 70, one of which is illustrated in FIG. 5, operatively attached thereto. Each of the assemblies 70 consists basically of a cross-fitting 71 having four threaded openings situated 90° apart so that opposite openings form a straight passageway through the cross-fitting 71. The conduit 45 is actually broken up into sections and two sections are threaded into opposite openings in the cross-fitting 71 to form the continuous conduit 45. Each of the other two openings in the cross-fitting 71 have a reducer bushing 72 threadedly engaged therein and the bushing 72 has a street L 73 threadedly engaged therein. The open end of the street L 73 has a nozzle 74 threadedly engaged therein which provides a spray having the desired pattern or width. While almost any pattern might be utilized in the present apparatus a fan shaped spray as illustrated is the most desirable. The street L's 73 on either side of the conduit 45 are turned at slight angles to each other, as seen particularly in FIG. 3, and adjacent nozzle assemblies 70 are spaced apart a distance sufficient to allow the spray patterns to overlap considerably. Thus, the nozzle assemblies 70 in the conduit 45 provide three curtain-like sprays across the top of an automobile transverse to the longitudinal axis thereof.

Each of the vertical conduits 47 have a plurality of vertically spaced apart nozzle assemblies 75 fixedly attached thereto. The nozzle assembly 75 can be seen more clearly by referring to FIGS. 4 and 6. Each of the nozzle assemblies 75 consist of a nipple 76 which is fixedly attached at one end to the conduit 47 and extends radially outwardly therefrom. The nozzle assemblies 75 are staggered so that they extend outwardly from the conduit 47 to the left, to the right, and inwardly toward the automobile. The nipples 76 extending outwardly to the left and right of the conduit 47 each have a street L 77 threadedly engaged therein with a nozzle 78 threadedly engaged in the street L and directed inwardly toward the automobile. The nipples 76 which are affixed to the inner surface of the conduit 47 and directed toward the automobile simply have a nozzle 78 threadedly engaged therein. The lower end of the conduit 47 has a nozzle assembly 79 threadedly engaged thereon which is similar to the nozzle assemblies 70 except that the base member is a T-fitting 80 rather than the cross-fitting 71. The nozzles 78 in the apparatus along the sides of the automobile provide fan shaped sprays similar to the nozzles 74. Thus, all of the nozzle assemblies 75 and 79 cooperate to form three curtain-like sprays horizontally spaced apart along each side of the automobile which are directed substantially along the same cross-section of the automobile as the spray produced by the nozzle assemblies 70. The entire assembly produces three curtain-like sprays which are horizontally spaced apart along the longitudinal axis of the automobile and each of which completely encompass the surface of the automobile including a portion of the underside by the rocker panels.

The conduit 45 has a T-fitting 85 threadedly engaged therein and adjacent the left end thereof. A rigid conduit 86 is threadedly engaged in one opening of the T-fitting 85 and extends substantially vertically upward therefrom. The conduit 86 extends through a hole 87 in the upper side 35 of the enclosure 24'. The rigid conduit 86, through 90° elbows 88 or by means of bending, is formed into a U-shaped handle-like assembly with one arm of the U extending vertically downwardly along the exterior edge of the stationary frame 20. The free end of the rigid conduit 86 has a flexible conduit 89 attached thereto the free end of which is in turn attached to a fluid outlet 90 situated in a wall or the like on the exterior of the car washing assembly and approximately in a plane passing perpendicularly through the longitudinal center of the car washing assembly. The length of the flexible conduit 89 is limited so that movement of the movable frame 24 from the center of the stationary frame 20 produces a force on the rigid conduit 86 which in turn produces a torque on the conduit 45. Thus, as the movable frame 24 progresses toward either end of the automobile the conduit 45 is rotated about its longitudinal axis and, through the pivotal means 49, the conduits 47 are rotated about their longitudinal axes. When the movable frame 24 is centered with respect to the longitudinal axis of the automobile, as illustrated by position A in FIG. 2, the spray from the nozzle assemblies 70, 75 and 79 all are in a plane substantially perpendicular to the longitudinal axis of the automobile. As the movable frame 24 moves to position B at the front of the automobile or position C at the rear of the automobile, illustrated in FIG. 2, the conduits 45 and 47 are rotated and the nozzle assemblies 70, 75 and 79 are turned to spray the front and rear of the automobile respectively.

A block diagram of the fluid pumping system is illustrated in FIG. 9 with a fluid tank generally designated 95 which has three compartments therein. A first compartment 96 containing a solution of water and detergent or other cleaning solution, a second compartment 97 containing pure water and a third compartment 98 containing a solution of water and softener. The pure water compartment 97 has a pair of floats 99 and 100 therein for maintaining the level of the water at approximately a desired amount. Float 99 is a maximum level float and it closes the water inlet to compartment 97 when the water level goes above the desired amount. Float 100 is a minimum level float and it opens a switch 101' whenever the water level drops below a desired amount.

A circulating pump 101 is in communication with the detergent tank compartment 96 by means of an inlet conduit 102 and an outlet conduit 103. Pump 101 maintains the water detergent solution in tank 96 thoroughly mixed. A similar circulating pump 104 is in communication with the tank compartment 98 containing the solution of water and softener through an inlet conduit 105 and an outlet conduit 106. A main water line 110 is in communication with tank compartment 97 and extends to a pressure pump 111. A portion of the main line extends from the output 112 of the pressure pump 111 to the input 90 of the flexible conduit 89.

An injector pump 113 has its inlet 114 connected in communication with the outlet conduit 103 from the detergent tank 96. The outlet of the pump 113 is connected through a conduit 115 to the main water line 110. A bypass and valve 116 are connected from the inlet 114 to the outlet conduit 115 around the pump 113 to provide a smooth pumping action. A check valve 117 is situated in the conduit 115 to allow the flow of detergent into the main water line 110 but to prevent the flow of water in the other direction. The inlet 118 of an injector pump 119 is connected to the outlet conduit 106 for the softener tank 98 while the outlet of the pump 119 is connected to the main water line 110 by means of a conduit 120. A bypass and valve 121 is connected between the inlet 118 and the outlet conduit 120 around the pump 119 to provide a smooth pumping action. A check valve 122 is situated in the conduit 120 to allow the flow of softener from the pump 119 to the main water line 110 but to prevent the flow of water in the opposite direction. A pressure sensitive switch 123 is in communication with the outlet 112 of the pump 111. The pressure switch 123 has a pair of contacts therein which open should the pressure in the conduit 112 drop below a predetermined amount.

A solenoid valve 125 is positioned in the conduit 110 between the water tank 97 and the pressure pump 111. The purpose of the solenoid valve 125 is to reduce the pressure or flow of the water in the main line 110 in the de-energized state and to allow a normal pressure or flow of water in the conduit 110 in the energized state. A cross-section of the solenoid valve 125 is illustrated in FIG. 10. The solenoid valve 125 has an irregular shaped hollow housing 126 with an internally threaded inlet 127 and an internally threaded outlet 128. The main conduit 110 is threadedly engaged in the inlet 127 and the outlet 128 to allow the flow of water into and out of the housing 126. A partition 129 is positioned between the inlet 127 and the outlet 128. The partition 129 in conjunction with a protrusion 130 adjacent the outlet 128 separates the housing 126 into two chambers, 131 and 132. Chamber 131 is in communication with the inlet 127 and chamber 132 is in communication with the outlet 128. The partition 129 and the protrusion 130 separate the chambers 131 and 132 except for a relatively large opening 133 between the partition 129 and the protrusion 130 and a relatively small opening 134 through the partition 129.

The upper edges of the partition 129 and the protrusion 130 are formed into a valve seat which receives a valve element 135 thereon. The valve element 135 is attached to the core of a solenoid by means of a valve stem 136 which passes out through an opening in the upper surface of the housing 126. A solenoid coil 137 is fixedly attached to the upper surface of the housing 126 and it is illustrated partially broken away in FIG. 11. A compression coil spring 138 is mounted coaxially around the valve stem 136 and biases the valve element 135 in the normally closed position. When the valve element 135 is biased in the normally closed position the opening 133 is fluid tight and the only opening between the chamber 131 and 132 is the relatively small opening 134. When the solenoid coil 137 is energized the valve element 135 is raised and the opening 133 is opened to allow a large flow of fluid between the inlet 127 and the outlet 128.

FIG. 11 is a schematic diagram of the electrical circuitry in the vehicle washing apparatus. The line 140 at the left side of the figure is adapted to be connected to a suitable power source, such as 115 volt 60 cycle, and is referred to as the high side of the line. The line 141 at the right side of the figure is adapted to be connected to the same power supply and is the return line or the neutral line. A first junction 142 on the line 140 has a normally open push button switch 143 operatively attached thereto. The other side of the switch 143 is connected to a movable contact of a switch 100' which is mechanically attached to the float 100 in the water tank 97. The switch 100' has a stationary contact which is electrically connected to one side of a relay coil 144m. The other side of the relay coil 144m is connected to the line 141 at a junction 145. Thus, when the push button switch 143 is depressed and the tank 97 has more than the minimum level of water therein, the relay coil 144 is energized. The relay coil 144 has a pair of normally open contacts 144a one of which is attached to the line 140 at a junction 146 and the other of which is attached to one side of a relay coil 147. The other side of the relay coil 147 is attached to line 141 at a junction 148. Thus, when the relay coil 144m is energized the contacts 144a close and the coil 147 is energized. The relay 144m is the latching type which maintains the contacts 144a closed until a reset coil 144r is energized.

Coil 147 has four sets of contacts 147a–147b associated with it. One contact of the set of contacts 147a is connected to a junction 149 on line 140 and the other contact is connected to a normally closed stationary contact 150a of a manual switch 150. A second normally open stationary contact 150b is connected to the line 140 at a junction 151. The movable contact of the manual switch 150 is connected to a junction 152. One side of the pressure pump 111 is connected to the junction 152 while the other side is connected to a junction 153 on line 141. The two circulating pumps 101 and 104 are connected in parallel and one side thereof is connected to the junction 152 while the other side is connected to a junction 154 on line 141. The pumps 101, 104 and 111 are connected in parallel and the closure of the contacts 147a completes a circuit through the pump. The switch 150 provides a manual means for energizing the pumps 101, 104 and 111 without energizing the remainder of the apparatus for purposes of maintenance or premixing cleaning and softening solutions.

One contact of the second pair of contacts 147b associated with relay coil 147 is connected to the line 140 at a junction 155. The other contact of the contacts 147b is connected to the movable contact of a stepping switch 156. The stepping switch 156 has seven stationary contacts or steps a–g. The stepping switch 156 is of the type that advances one step each time it receives a pulse of energy across the main coil, which is designated 156m, and which returns to the first position each time it receives a pulse of energy across a reset coil designated 156r. The electrical connection of the main coil 156m and the reset coil 156r will be explained presently. Each of the steps b–f of the switch 156 are connected to a movable contact of a multiposition manual switch 157–161 respectively. The step a of switch 156 has no connection thereto and the step g thereof has a reset connection which will be explained presently.

Each of the switches 157–161 has five positions designated a–e and all of the positions, except c, are electrically connected in parallel. The position c on each of the switches 157–161 has no electrical connection thereto for purposes which will be explained presently. All of the positions a of switches 157–161, which are connected electrically together, are connected to one side of a relay coil 162 the other side of which is connected to the line 141 at a junction 163. All of the positions b of switches 157–161, which are connected electrically together, are connected to one side of the cleaner injector pump 113 and the other side is connected to the line 141 at junction 164. All of the positions d of switches 157–161, which are connected electrically together, are connected to one side of the softener injector pump 119 the other side of which is connected to the line 141 at a junction 165. A counter 166, which moves one digit each time a pulse of energy is applied thereto, reset coil 156r, reset coil 144r, a relay coil 167 and a five second time delay relay activating element 168 are connected in parallel with one side electrically attached to a junction 169 and the other side connected to the line 141 at a junction 170. The contact g of stepping switch 156 is connected to the junction 169. One side of a normally closed set of contacts 167a associated with relay coil 167 is connected to all of the positions e of switches 157–161. The other side of the contacts 167a are connected to a junction 171. One side of a second set of normally open contacts 167b associated with relay coil 167 is connected to the line 140 at a junction 172 while the other side is connected to the junction 171. A set of normally closed contacts 168a associated with time delay relay element 168 has one side connected to the junction 171 while the other side is connected to the junction 169. A manual reset push button switch 173 also has one side attached to the junction 169 while the other side is attached to a junction 174 in the line 140.

One side of a third pair of contacts 147c associated with relay coil 147 is connected to the line 140 at a junction 175 while the other side is connected to a junction 176. One side of a normally closed pair of contacts 162a associated with relay coil 162 is connected to the junction 176 while the other side is connected to one side of a relay coil 177. The other side of the relay coil 177 is connected to the line 141 at a junction 178. A pair of contacts 177a associated with relay 177 are connected in series with the solenoid coil 137 of the solenoid valve 125 between the lines 140 and 141, illustrated at the bottom of FIG. 11. The limit switch 40 at the upper right surface of the movable frame 24 has two sets of normally open contacts 40a and 40b. The contacts 40a are closed when the limit switch 40 engages the actuating pin 42 and the contacts 40b are closed when the limit switch 40 engages the actuating pin 43. The contacts 40a and 40b of the limit switch 40 are connected in parallel with one side connected to the terminal 176 and the other side connected to a terminal 179. A relay coil 180m has one side connected to the terminal 179 while the other side is connected to a terminal 181 on line 141. A reset coil 180r associated with the relay coil 180 has one side connected to a terminal 182 on line 141 while the other side is connected to one contact of a pair of contacts 39a for the limit switch 39 positioned on the upper surface at the left of the movable frame 24. The other contact of the pair of contacts 39a is connected to the terminal 176. A normally closed set of contacts 180a associated with the relay coil 180 has one side connected to the terminal 179 while the other side is connected to one side of a normally closed set of contacts 183a associated with a relay coil 183. The other side of the set of contacts 183a is connected to a terminal 184.

Connected in parallel between the terminal 184 and the terminals 185 on line 141 are a second time delay relay actuating element 186, a relay coil 187, the stepping switch coil 156m and the normally closed contacts of a dual position push button reversing switch 188 in series with a relay coil 189. The normally open contacts 188a of the push button reversing switch 188 have one side connected between the normally closed contacts and the relay coil 189 while the other side is connected to a junction point 190 in the line 140. The push button reversing switch 188 is used in maintenance or installation of the apparatus for reversing the driving motor 38 and the operation thereof will not be explained in more detail since it will become obvious upon an explanation of the operation of the remainder of the circuitry. A pair of normally closed contacts 183b associated with the relay coil 183 and a pair of contacts 187a associated with the relay coil 187 are connected in series between a terminal 191 in line 140 and the terminal 184. A pair off contacts 186a associated with the relay coil 186 and the relay coil 183 are connected in series between the terminal 191 in the line 140 and a terminal 192 in the line 141.

A fourth set of contacts 147d associated with the relay coil 147 are connected in series with the contacts of the pressure switch 123 between a terminal 193 in the line 140 and a terminal 194. Two sets of contacts 189a and 189b, either one of which is closed while the other is open, each have one side connected to the terminal 194 while the other sides are connected to a pair of terminals 195 and 196 respectively.

The reversible driving motor 38 has connections 38a which cause the motor to travel in a forward direction and connections 38b which cause the motor to travel in a reverse direction. The connections 38a of motor 38 are connected in parallel with a relay coil 197 between a junction 198 and a junction 199 in the line 141. A first pair of contacts 197a associated with the relay coil 197 have one side connected to the junction 195 while the other side is connected to the junction 198. A second normally closed pair of contacts 197b associated with the relay coil 197 have one side connected to the junction 195 while the other side is connected to a junction 200. One side of a five second time delay relay activating element 201 is connected to the junction 200 while the other side is connected to a junction 202 in the line 141. A pair of contacts 201a associated with the time delay relay element 201 are connected in series with a normally closed pair of contacts 197c associated with the relay coil 197 between the terminal 200 and the terminal 198.

The connections 38b of the driving motor 38 are connected in parallel with a relay coil 203 between a terminal 204 in the line 141 and a terminal 205. A first pair of contacts 203a associated with the relay coil 203 are connected between the terminal 196 and the terminal 205. A second pair of normally closed contacts 203b associated with the relay coil 203 are connected between the terminal 196 and the terminal 206. A five second time delay relay activating element 207 is connected between the terminal 206 and a terminal 208 in the line 141. A third set of normally closed contacts 203c associated with the relay coil 203 and a pair of contacts 207a associated with the time delay relay element 207 are connected in series between the terminal 205 and the terminal 206.

*Operation*

When the push button start switch 143 is depressed and the water level in tank 97 is high enough to close the minimum level float switch contacts 100′ relay coil 144m is energized and relay contacts 144a close. The closure of relay contacts 144a energizes the relay coil 147 closing the contacts 147a, 147b, 147c and 147d. The relay coil 144m is of the latching type and the contacts 144a remain closed until the reset coil 144r is energized. Thus, the contacts 147a through 147d remain closed until the reset coil 144r is energized. The closure of contacts 147a applies power to the pressure pump 111 and the two mixer pumps 101 and 104. The closing of contacts 147b has no effect since the movable contact of stepping switch 156 is on the first step *a* thereof which has no electrical connections thereto.

The closing of the contacts 147c applies power to the relay coil 177 through the normally closed contacts 162a and contacts 177a are closed energizing the solenoid coil 137. Energizing the solenoid coil 137 raises the valve element 135 allowing the full flow of water to pressure pump 111 and, thus, full water pressure at the output 112. At the beginning of the operation the movable frame 24 will generally be at the position C illustrated in FIG. 2 and the contacts 40a of the limit switch 40 will be closed thereby applying power through the normally closed contacts 180a and 183a to the time delay relay actuating element 186, relay coil 187, relay coil 189 and stepping switch coil 156.

Energizing the stepping switch coil 156 causes the movable contact of the stepping switch 156 to move from the step *a* thereof to the step *b* thereof, thereby, applying power by way of the closed contact 147b to the moving contact of the manual multiposition switch 157. The switches 157–161 are illustrated as they might be manually positioned for one washing sequence. It should be understood that any sequence could be chosen and, in fact, many other operations could be added but the present sequence is illustrated for example. Since the multiposition switch 157 is placed in contact with position *a*, power is applied to the relay coil 162 which causes the normally closed contacts 162a to open. When the contacts 162a open power is no longer applied to the relay coil 177 and the contacts 177a open de-energizing the solenoid coil 137. The de-energization of the solenoid coil 137 causes the valve element 135 to close the opening 133 in the solenoid valve 125 and the amount of water applied to the pressure pump 111 is greatly reduced. Thus, the first step in the washing cycle is a low pressure rinse.

Simultaneous with the energization of the relay coil 156m, the relay coil 189 is energized which causes the contacts 189a to close. Assuming the pressure at the output of pump 111 is sufficient the contacts of the pressure sensing switch 123 are closed and power is applied through the closed contacts 147d, switch 123, the closed contacts 189a and the normally closed contacts 197b to the five second time delay relay activating element 201. Five seconds later the contacts 201a close and a circuit is completed through the relay coil 197 and the connections 38a which cause the motor 38 to move the movable frame 24 in a forward direction. Thus, the movable frame 24 travels the length of the automobile applying a low pressure rinse thereto.

As the movable frame 24 moves from the position C at the right end of the stationary frame 20 the limit switch 40 disengages the activating pin 42 and contacts 40a open. However, before this happens (simultaneous with the energization of coil 156m and 189) the relay coil 187 is energized closing the contacts 187a and power is applied to the terminal 184 through normally closed contacts 183b and closed contacts 187a. As contacts 40a close power is also applied to the relay coil 180m which opens contacts 180a and breaks one circuit to the terminal 184. Since the relay coil 180 is the latching type, contacts 180a remain open until reset coil 180r is energized. Simultaneously with the energization of stepping switch coil 156m, relay coil 189 and relay coil 187 the two second time delay relay activating element 186 is energized. Two seconds after power is applied to the element 186 contacts 186a close and power is applied to the relay coil 183. Applying power to relay coil 183 opens normally closed contacts 183a and normally closed contacts 183b completely removing power from the terminal 184 and de-energizing stepping switch coil 156m, relay coil 189, relay coil 187 and, eventually, relay coil 183. However, the relay 189 is of the type in which the contacts 189a remain closed until power is again applied to the relay coil 189. Thus, the movable frame 24 continues to move in the forward direction.

As the movable frame 24 passes the center position A, illustrated in FIG. 2, the actuating pin 41 engages the limit switch 39 and contacts 39a close energizing relay 180r. By energizing the reset coil 180r the contacts 180a, which are open, return to the normal or closed position and the circuit is ready for the next operation.

As the movable frame 24 continues to position B at the far end of the stationary frame 20 the limit switch 40 eventually engages the actuating pin 43 and contacts 40b close. When the contacts 40b close power is again applied through the closed contacts 180a and the closed contacts 183a to the two second time delay relay element 186, relay coil 187, relay coil 189 and stepping switch coil 156m. The energization of the coil 156m causes the moving contact of the stepping switch 156 to move to position *c* thereof, thereby energizing the multiposition switch 158 which is in position *b*. Thus, power is applied to the cleaning solution injector motor 113 and cleaner is provided at the output 112 of the pressure pump 111. Also, since the moving contact of the stepping switch 156 has moved from position *b* the relay coil 162 is no longer energized and contacts 162a return to their normally closed position, thereby, energizing relay coil 177. The energization of relay coil 177 causes the contacts 177a to close energizing the solenoid coil 137 which raises the valve element 135 and allows a full flow of clear water to the pressure pump 111. Thus, high pressure cleaning solution and water is applied to the surface of the automobile.

Energization of the relay coil 189 causes contacts 189a to open and contacts 189b to close which applies power through the normally closed contacts 203b to the five second time delay relay activating element 207. After five seconds contacts 207a of time delay relay 207 close applying power through the normally closed contacts 203c to the relay coil 203 and the motor connections 38b which cause the motor 38 to drive the movable frame 24 in the reverse direction. The energization of the relay coil 203 causes the contacts 203b and 203c to open while the contacts 203a close, thereby, maintaining power on the relay coil 203 and the connections 38b to the motor 38 until the contacts 189b are opened.

As the movable frame 24 moves back towards position C it again passes the center position A and the limit switch 39 engages the activating pin 41 closing contacts 39a and preparing the entire circuit for the next operation, as previously explained. When the limit switch 40 engages the activating pin 42 the contacts 40a close causing the motor 38 to again travel in the forward direction as previously described and the stepping switch 156 to move to step *d* thereof. Since there is no connection to the position *c* of multiposition switch 159, connected to step *d* of switch 156, clear water under high pressure is applied to rinse the cleaner from the surface of the automobile. Operations similar to those described again reverse the motor 38 at the opposite end of the stationary frame 20 (position B) and cause the stepping switch 156 to move to position *e* thereof which supplies power to the multiposition switch 160 and to the softener injector pump 119 through position *d* of the switch 160.

When the softener cycle is completed the movable frame 24 is in position C and the closing of contacts 40*a* cause the stepping switch 156 to move to step *f* thereof and to supply energization to the multiposition switch 161. Switch 161 is in position *e*, or the reset position, and power is supplied through the normally closed contact 167*a* and the normally closed contact 168*a* to the counter 166, the stepping switch reset coil 156*r*, the reset coil 144*r*, relay coil 167 and the five second time delay relay activating element 168. Energization of the counter 166 causes it to move one digit forward. Energization of the reset coil 156*r* returns the moving contact of the stepping switch 156 to position 156*a*. Energization of the reset coil 144*r* unlatches the contact 144*a* associated with the relay coil 144 and de-energizes coil 147 which allows contacts 147*a* through 147*d* to open. Energization of the coil 167 causes the normally closed contacts 167*a* to open and the normally open contacts 167*b* to close, which maintains power on the terminal 169 through the normally closed contacts 168*a*, even though the stepping switch 156 has moved from position 156*f*. After five seconds the time delay relay activating element 168 opens contacts 168*a* removing power from the terminal 169 and the entire circuit is in the start position and the apparatus is ready for the next automobile.

It should be noted that the multiposition selector switches 157-161 can be set for any sequence for washing operation as desired and more operations can be performed by supplying more selector switches in parallel or less operations can be performed by setting any of the earlier selector switches 157-160 to position E at which time the entire apparatus will be reset. Also, it should be noted that position *g* of stepping switch 156 is connected directly to the junction 169 and, therefore, if none of the multiposition selector switches 157-161 are placed in position *e* the stepping switch 156 will move to the final position *g* and reset the entire apparatus. Also, the apparatus can be reset manually at any time by depressing the push button 173 which supplies power to the junction 169.

Thus, a vehicle washing apparatus has been described which has the capabilities of being set to any number and variety of washing operations and which performs all of these operations automatically. Thus, the operator of the apparatus can conserve washing material by performing less operations on a relatively clean automobile while he can set the apparatus to perform more operations on a relatively dirty automobile. Therefore, the present apparatus is highly efficient.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. Automatic vehicle washing apparatus comprising:
 (a) a stationary frame adapted to receive a vehicle therein;
 (b) a movable frame mounted on said stationary frame for limited horizontal movement along the longitudinal axis of the vehicle;
 (c) control means adapted to be connected to a suitable source of electrical power, cleaning solution, and water, said control means including an output for cleaning solution and water under pressure and a reversible motor operatively attached to said movable frame for driving said movable frame along said stationary frame in a cyclic fashion;
 (d) liquid spraying means including a right and left substantially vertical conduit member and an upper substantially horizontal conduit member operatively attached together and to said output of said control means and pivotally mounted on said movable frame in a common plane for limited rotation about their respective longitudinal axes, said conduit members having a plurality of nozzles incorporated therein all of which provide a spray directed inwardly toward said vehicle;
 (e) pivotal means attached between said upper conduit member and each of said vertical conduit members for rotating each of said conduit members about their longitudinal axis a substantially equal amount in the same direction when one of said conduit members is rotated about its longitudinal axis; and
 (f) means operatively connecting one of said conduit members of said liquid spraying means to said output of said control means for causing rotation thereof about its longitudinal axis with movement of said movable frame along the longitudinal axis of said stationary frame.

2. An automatic vehicle washing apparatus substantially as set forth in claim 1 wherein the rotation causing means attached to the conduit member causes rotation of said conduit member in an amount proportional to the amount of longitudinal movement of the movable frame from the longitudinal center of the stationary frame and in a direction whereby the incorporated nozzles are directed substantially toward a vehicle within said apparatus.

3. Automatic vehicle washing apparatus comprising:
 (a) a stationary frame adapted to receive a vehicle therein;
 (b) a movable frame mounted on said stationary frame for limited horizontal movement along the longitudinal axis of the vehicle;
 (c) control means adapted to be connected to a suitable source of electrical power, cleaning solution, and water, said control means including an output for cleaning solution and water under pressure and a reversible motor for driving said movable frame along said stationary frame in a cyclic fashion;
 (d) liquid spraying means including a right and left substantially vertical conduit member and an upper substantially horizontal conduit member operatively attached together and pivotally mounted on said movable frame in a common plane for limited rotation about their respective longitudinal axes, said conduit members having a plurality of nozzles incorporated therein all of which provide a substantially inwardly directed spray;
 (e) pivotal means attached between said upper conduit member and each of said vertical conduit members for rotating each of said conduit members about their longitudinal axes a substantially equal amount in the same direction when one of said conduit members is rotated about its longitudinal axis; and
 (f) means operatively connecting said upper conduit to said output of said control means including a flexible conduit having a limited length so that movement of said movable frame along the longitudinal axis of said stationary frame causes rotation of said upper conduit about its longitudinal axis.

4. Control means for an automatic vehicle washing apparatus comprising:
 (a) reversible motor means operatively attached to said vehicle washing apparatus;
 (b) pumping means adapted to be connected to suitable sources of energization, cleaning solution, and water, said pumping means including an output for cleaning solution and an output for water upon suitable application of energization;
(c) a plurality of manually controllable multiposition switches connected in parallel and having means connecting said pumping means to each position for providing a different output from said pumping means in each position of said switches;
(d) stepping switch means having a plurality of steps each connected to a different one of said manually controllable switches and adapted to be connected to a source of energizing power in a manner to provide energizing power to each of said steps sequentially; and
(e) means for energizing said stepping switch means at desired intervals to cause said stepping switch means to move and energize the next sequential step thereby providing various washing operations chosen by the manual settings of the manually controllable switches, said energizing means also energizing said reversible motor means and causing said motor means to reverse each time said stepping switch means moves to the next sequential step.

5. Control means for an automatic vehicle washing apparatus comprising:
(a) reversible motor means operatively attached to said vehicle washing apparatus;
(b) a pressure pump having an output and adapted to be connected to a source of water and an energization source;
(c) pressure reducing means operatively attached to said output of said pressure pump and controllable to reduce the pressure output of said pump;
(d) a cleaning solution pump operatively connected to said output of said pressure pump and adapted to be connected to a source of cleaning solution for introducing cleaning solution into said output of said pressure pump when said cleaning solution pump is activated;
(e) a softener pump operatively connected to said output of said pressure pump and adapted to be connected to a source of softener for introducing softener into said output of said pressure pump when said softener pump is energized;
(f) reset means for returning said control means to the starting position;
(g) a plurality of manually controllable multiposition switches connected in parallel;
(h) means connecting said pressure reducing means to one position of said switches, said cleaning solution pump to a second position of said switches, said softener pump to a third position of said switches, and said reset means to a fourth position of said switches;
(i) stepping switch means having a plurality of steps each connected to a different one of said manually controllable switches and adapted to be connected to a source of electrical power in a manner to provide electrical power to each of said steps sequentially; and
(j) means for energizing said stepping switch at desired intervals to cause said stepping switch to move and energize the next sequential step thereby providing the various operations chosen by the manual settings of the manually controllable switches, said energizing means also energizing said reversible motor means and causing said motor means to reverse each time said stepping switch moves to the next sequential step.

6. Automatic vehicle washing apparatus comprising:
(a) a stationary frame adapted to receive a vehicle therein;
(b) a movable frame mounted on said stationary frame for limited horizontal movement along the longitudinal axis of the vehicle;
(c) control means including:
  (1) reversible motor means operatively attached to said movable frame for driving said movable frame along said stationary frame in a cyclic fashion,
  (2) a pressure pump having an output and adapted to be connected to a source of water and an energization source,
  (3) a plurality of manually controllable multiposition switches connected in parallel and having means attached to each position for performing a separate washing operation,
  (4) stepping switch means having a plurality of steps each connected to a different one of said manually controllable switches and adapted to be connected to a source of energizing power in a manner to provide energizing power to each of said steps sequentially, and
  (5) means for energizing said stepping switch means at desired intervals to cause said stepping switch means to move and energize the next sequential step thereby providing the various washing operations chosen by the manual settings of the manually controllable switches, said energizing means also energizing said reversible motor means and causing said motor means to reverse each time said stepping switch means moves to the next sequential step;
(d) liquid spraying means including a right and left substantially vertical conduit member and an upper substantially horizontal conduit member operatively attached together and to said output of said pressure pump and pivotally mounted on said movable frame in a common plane for limited rotation about their respective longitudinal axes, said conduit members having a plurality of nozzles incorporated therein all of which provide a spray directed inwardly toward said vehicle;
(e) pivotal means attached between said upper conduit member and each of said vertical conduit members for rotating each of said conduit members about their longitudinal axes a substantially equal amount in the same direction when one of said conduit members is rotated about its longitudinal axis; and
(f) means attached to one of said conduit members of said liquid spraying means causing rotation thereof about its longitudinal axis with movement of said movable frame along the longitudinal axis of said stationary frame.

References Cited
UNITED STATES PATENTS

| | | | |
|---|---|---|---|
| 2,676,600 | 4/1954 | Vani et al. | 134—123 |
| 3,038,481 | 6/1962 | Brechtel | 134—123 X |
| 3,259,138 | 7/1966 | Heinicke | 134—45 |
| 3,288,109 | 11/1966 | Smith et al. | 134—123 X |

FOREIGN PATENTS

| | | |
|---|---|---|
| 153,297 | 6/1963 | Russia. |

CHARLES A. WILLMUTH, *Primary Examiner.*

R. L. BLEUTGE, *Assistant Examiner.*